US006084367A

United States Patent [19]

Landert

[11] Patent Number: 6,084,367

[45] **Date of Patent: *Jul. 4, 2000**

[54] METHOD OF OPERATING A DOOR SYSTEM AND A DOOR SYSTEM OPERATING BY THIS METHOD

[76] Inventor: Heinrich Landert, Am Fasnachtsbuck 24, Bülach CH-8180, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,889

[22] Filed: Apr. 2, 1997

[30] Foreign Application Priority Data

Apr. 2, 1996 [DE] Germany ........................... 196 13 178

[51] Int. Cl.[7] ................................. H02P 1/04; H02P 3/00

[52] U.S. Cl. ............................................ 318/466; 318/283

[58] Field of Search .................................... 318/280–286, 318/466–472, 460, 445, 480, 483; 348/152–156; 49/26, 28, 113; 160/291, 292, 293.1

[56] References Cited

U.S. PATENT DOCUMENTS

| | | | |
|---|---|---|---|
| 3,988,533 | 10/1976 | Mick et al. | 178/6.8 |
| 4,498,033 | 2/1985 | Aihara et al. | 318/261 |
| 4,563,625 | 1/1986 | Kornbrekke et al. | 318/603 |
| 4,627,193 | 12/1986 | Schwarz | 49/42 |
| 4,827,264 | 5/1989 | Bjelk | 49/324 |
| 4,832,260 | 5/1989 | Spilde | 49/141 |
| 4,847,485 | 7/1989 | Koelsch | 250/221 |
| 4,993,049 | 2/1991 | Cupps | 377/6 |
| 5,247,232 | 9/1993 | Lin | 318/468 |
| 5,258,586 | 11/1993 | Suzuki et al. | 187/124 |
| 5,315,434 | 5/1994 | Mizuno et al. | 359/355 |
| 5,387,768 | 2/1995 | Izard et al. | 187/392 |
| 5,396,284 | 3/1995 | Freeman | 348/154 |
| 5,504,520 | 4/1996 | Yamamoto | 348/154 |
| 5,541,585 | 7/1996 | Duhame et al. | 340/825.69 |
| 5,576,739 | 11/1996 | Murphy | 340/825.06 |
| 5,605,013 | 2/1997 | Hogston | 49/31 |
| 5,620,137 | 4/1997 | Coelho et al. | 236/47 |
| 5,637,040 | 6/1997 | Kim et al. | 454/256 |
| 5,637,964 | 6/1997 | Hakkarainen et al. | 315/295 |
| 5,699,243 | 12/1997 | Eckel et al. | 364/140 |

FOREIGN PATENT DOCUMENTS

| | | |
|---|---|---|
| 0492689 | 7/1992 | European Pat. Off. . |
| 0504953 | 9/1992 | European Pat. Off. . |
| 2720382 | 11/1978 | Germany . |
| 7927320 | 12/1979 | Germany . |
| 3339997 | 5/1984 | Germany . |
| 3940176 | 5/1991 | Germany . |
| 4023673 | 2/1992 | Germany . |
| 4134922 | 12/1992 | Germany . |
| 9317816 | 2/1994 | Germany . |
| 4344729 | 6/1995 | Germany . |
| WO 92/11544 | 7/1992 | WIPO . |

OTHER PUBLICATIONS

Horton Automatics B41 "Automatic Swinging Doors", Operator Specifications, Dec. 1995.

Horton Automatics F196 "Large Diameter Revolving Doors", Operator Specifications, Dec. 1995.

Horton Automatics A22 "Automatic Sliding Doors", Operator Specifications, Dec. 1995.

Horton Automatics F191 "Security Revolving Doors", Operator Specifications, Dec. 1995.

(List continued on next page.)

*Primary Examiner*—Jonathan Salata
*Attorney, Agent, or Firm*—Baker & Maxham

[57] ABSTRACT

A method for operating a door system having a stationary structure and at least two motor-driven door elements movable independently from each other, where the movements of these elements are controlled and coordinated by at least one higher-ranking processor or at least one higher-ranking program module such that preselected criteria (entrance capacity, heat loss, security, etc.) are optimally satisfied with regard to the traffic situation detected by sensors (density, space required, direction of movement, speed, identification of users) and/or ambient conditions (temperature, wind, pressure differences, air turnover required).

44 Claims, 15 Drawing Sheets

OTHER PUBLICATIONS

*Operator Flash,* Fa. Manusa Puertas Automatics, 22 pages (Sep. 1991).

*WAREMA Steuerungen,* Fa. WAREMA Sonnenschutztechnik ausgegeben auf der R 94 in Stuttgart vom 10, 4 pages (Mar. 1994).

*WAREMA–Sun–Processor,* Fa. WAREMA Sonnenschutztechnik ausgegeben auf der R 94 in Stuttgart vom10, 6 pages (Mar. 1994).

e)

f)

g)

h)

a)

b)

METHOD OF OPERATING A DOOR SYSTEM AND A DOOR SYSTEM OPERATING BY THIS METHOD

BACKGROUND

1. Field of the Invention

This invention generally concerns a door operating system having a variable programmed operating method to satisfy certain preselected criteria.

2. Description of the Related Art

Relevant door systems have become known, for example, from PCT publication WO 9,211,544, but in that case a door that opens and closes automatically is controlled by the fact that the height of an object that is to pass through the door is recognized from the outside and the extent of opening of the door is adjusted accordingly. This known technique is thus limited to a door that opens and closes vertically and makes it possible for a delivery car or truck, for example, to drive into a building, so the extent of opening is controlled according to the height of the vehicle.

With such a door system, however, the number of people desiring to enter a certain building cannot be taken into account. Door systems such as those used especially with large buildings have the challenge that the door system must be designed to be as free of drafts as possible. This term is understood to refer to the fact that an airlock-type passageway is created in the area of the door system, so that at least one side—the side forming the closure for the building—is always closed, so no outside air can penetrate directly into the building. On the other hand, however, in many situations the passage of people and/or vehicles through the door system should be hindered as little as possible and the entrance should be as inviting as possible to passersby—which is probably best achieved with a completely open entranceway.

Such a requirement that the building be free of drafts is encountered especially in bad weather conditions, such as, for example, cold outdoor temperatures, rain, wind and snow, etc. Under other weather conditions it may not be necessary to keep the building draft-free in all cases, however, and the doors should be opened as invitingly as possible and should remain open to guarantee unhindered access to the building.

Another problem is that the opening response of the door system should be adapted to the frequency at which people pass through the door, that is, the opening response should be different when a large number of people are passing through the door system from that when, for example, only one person is passing through the door system.

This behavior, namely, adjusting the door system to the number of people passing through it, should also be modified in accordance with the weather conditions described above and/or the comfort requirements in the interior area at the time in question, for example, freedom from drafts.

The ideal would be for a door to open only as much as necessary for one or more people to pass through, that is, the door should close "at the proper point" (this is understood to refer to the cross-over line of anyone passing through the door system), namely, only to the extent required for the specific number of people in each case and also only as long as is necessary for this individual passage of people.

Previously, however, with the known systems, such a door system could be either opened completely or a so-called winter opening (to be adjusted manually) could be set. The disadvantage of complete opening is that a great deal of heat is lost, even if only a single person goes through the door, and energy is wasted unnecessarily to drive the entire door combination.

The manually adjusted winter setting mentioned earlier has, of course, the advantage that only a relatively small opening is allowed for the person to enter, but it also has the disadvantage that the winter setting cannot easily be overridden or automatically enlarged to the required extent when several people want to pass through the door.

SUMMARY OF THE INVENTION

A primary purpose of this invention is therefore to improve on a door system and a method of operating a door system of the type defined initially such that the opening and closing of the door system are controlled individually as a function of the detected traffic situation and as a function of ambient conditions.

The essential feature of the present invention is the creation of a so-called intelligent door that makes it possible for the first time to control the opening and closing of a complete door system in accordance with the traffic situation and ambient conditions, such as temperature, wind, pressure differences, air turnover demand and similar parameters.

A significant advantage of the invention is that a door system can be programmed individually for a given building in such a way as to offer access or passage for people and/or vehicles with as little draft as possible on the one hand, while on the other hand presenting the least possible hindrance to such access or passage and also adapting precisely to the prevailing needs of the building at all times.

It is thus important that the traffic situation in front of the door system is detected with appropriate sensors. Such sensors may include one or more video cameras connected to an appropriate video image processing system to ascertain how many people and/or vehicles are approaching the door system or are passing by the door system without attempting to enter this door system.

For the sake of simplicity, the following description will concern only a door system for admission or passage of people. However, this invention is not limited to this embodiment, but instead it concerns door systems in general that are suitable only for people and/or vehicles.

In addition to detecting the traffic situation in front of the door system by means of video cameras, other detection media may also be provided according to this invention, such as weight identification of the approaching people by means of appropriate weighing platforms in front of the door system, speed detection of approaching people by appropriate ultrasonic or microwave detectors, among others. Detection of such a traffic situation by appropriate video, ultrasound or microwave field analysis is also possible.

However, the determination of the traffic situation to control the opening and closing of the door system is not limited just to the detection of crowd density (number of people per unit of time) wanting to pass through the door, but other criteria can also be used to determine the traffic situation, which can be entered into the microprocessor control system according to this invention.

Another criterion according to this invention is the space required for the people passing through the door system, which also modifies the extent of opening of the door system. Such difference in space requirement occurs, for example, when a person in a wheelchair or someone loaded with luggage wants to pass through the door system. Then according to this invention, a different extent of opening is provided than that for just a single person without bags, for example.

The control system should, of course, also detect the direction of movement of people wanting to pass through the door system. People passing by in parallel to the door system should thus be detected in as much as they do not cause the door system to open or close.

Likewise, in another embodiment of the technical teaching of this invention, the speed of a person approaching the door system is detected to assure that the door system will open at a high speed and/or earlier when such a person is approaching the door at a high rate of approach. Accordingly, a slow opening speed and/or a relatively late opening time is used when a person approaches the door at a slow rate of approach. The location of passage of the person through the door system should also be detected at the same time. Only the door panels in the direction of passage of the person should be operated.

In a further embodiment of the present invention, people wanting to pass through the door system can also be identified accordingly. There are various known identification systems, but they are all included within the scope of the present invention. Such a known identification system might include a voice print of the respective person, who is then allowed to pass through the door system only if identified properly. Another possibility is video image recognition of the person passing through, fingerprint identification, hand print identification, iris identification, among others. All applicable identification systems are intended to be included within the scope of the present invention.

All the above-mentioned parameters are combined according to this invention with the parameters regarding the ambient conditions to control the opening and closing of the door system accordingly. In a preferred embodiment of the invention, first the temperature, the wind, the pressure difference between the indoor and outdoor areas, as well as the air turnover requirement of the building, especially in the entrance area, are taken into account and entered into the microprocessor as control parameters. For example, if a low temperature prevails in the outdoor area in front of the building, the opening of the door should be influenced in such a way that the door is controlled so there is as little draft as possible while at the same time there is the least possible exchange of air between the outside and inside areas. The same thing is true of wind conditions that are detected by the control system or pressure differences based on the pressure inside the building and the air pressure prevailing outside the building. Likewise, the air turnover requirements of the building and/or parts of the building can be determined and taken into account by the control system as an additional parameter to influence the performance of the door system.

In all these embodiments, it is important that one or more of the above-mentioned criteria is entered into the control system of the invention, either alone or in combination, so there is a wide range of applications for such an intelligent door system. Thus the perviousness of the door system is controlled as a function of the above-mentioned parameters.

Major elements for the operating performance of the automatic entrance of the invention during a certain interval of time (for example, an hour or a day), in particular, its perviousness, can be described by suitable characteristics and thus they can also be analyzed by a microprocessor control system in the desired sense. Such characteristics include those to describe the traffic load through the door, its openness, its closure (based on load), freedom from drafts and perviousness (if allowed by the environment). These characteristics may be defined in different ways, depending on the type of door (for obvious reasons, for example, slightly different definitions are necessary for revolving doors, to some extent) and the desired functioning of the entrance in the individual case, for example, for an entrance with at least two sliding doors in succession:

Traffic load: The percentage amount of the maximum available passage width effectively claimed by a person passing through the door, determined, for example, by means of light curtains in the door openings or approximately by the average number of people in the space between door elements at the same time, averaged over time and divided by a length factor that depends on the distance between doors.

Openness: Percentage amount of maximum available passage width that is effectively open (that is, 50% for a half-opened door, for example) averaged over time.

Closure (based on load): Ratio of the traffic load divided by the openness. This characteristic indicates what percentage of the average extent of opening of the passage would be absolutely necessary for a person to pass through in the unit of time in question. The lower this value, the greater is the (avoidable) heat loss, but on the other hand, the "more open" the entrance, the "more inviting" it is.

Freedom from drafts: Percentage amount of the interval of time in question during which at least one completely closed door or door combination prevents drafts.

Perviousness (if allowed by the environment): A wide or prolonged opening of the entrance (or a short or prolonged waiving of the freedom-from-drafts requirement) is more acceptable

- the smaller the temperature difference between the inside and outside,
- the less wind there is,
- the nicer the weather is (for example, no rain or snow),
- the smaller the difference in pressure between the inside and outside,
- the lower the demands for comfort (e.g., freedom from drafts) in the entrance area, or
- the greater the air turnover required in the entrance area of the building.

Obviously when using the definitions cited as examples, the traffic load must not exceed the openness value, and thus the load-based closed factor may equal at most a value of one, and then only when the door system according to one of the embodiments according to this invention is open only when and where and to the extent and only as long as absolutely required for the passage of the person(s).

The 100% freedom from drafts which is the goal in many cases (at least in cold weather) requires that at least one door of a passageway of a door system must always be completely closed, which thus reduces the maximum possible traffic load to a value clearly below 50% in the case of two doors, one after the other. This may be highly undesirable under certain circumstances (rush-hour traffic, emergency exit). The advantages of the intelligent control system for the doors according to this invention as a function of the traffic situation (e.g., the traffic load) and the environment (e.g., weather conditions) are manifested, for example, in the fact that the system will automatically completely release the entrance (100% openness) if necessary, despite the optimum freedom from drafts and the fact that the openness is limited to the required or desired extent (minimum heat loss), and then as soon as possible and desired, the system automatically returns to a reduced openness that is optimally adapted to the prevailing traffic and weather conditions (no drafts, minimal heat loss) or it returns to increased closure (based on load).

BRIEF DESCRIPTION OF THE DRAWING

The objects, advantages and features of this invention will be more clearly perceived from the following detailed description, when read in conjunction with the accompanying drawing, in which:

FIG. 3 comprises graphic representations of examples of a door system according to this invention showing a telescoping sliding door arrangement with five separately driven and controlled door panels, wherein:

- FIG. 3*a* shows the door system of the invention in a completely closed position;
- FIG. 3*b* shows the door system of FIG. 3*a* in a completely open position;
- FIG. 3*c* shows the door system of FIG. 3*a* in a partially open position under the control of the parameters according to this invention.
- FIG. 3*d* depicts the door system of FIG. 3*a* in an alternative partially open position under the control of the parameters according to this invention.

FIG. 4 comprises graphic representations of another embodiment of the door system according to this invention with three different passageways, wherein:

- FIGS. 4*a*–4*d* show examples of progressive sequences of movement processes of this alternative door system under certain operating conditions;

FIG. 5 graphically provides examples of a door system according to this invention with four separately driven simple sliding panels, wherein:

- FIGS. 5*a*–5*d* show examples of a progressive sequence of how this alternative door system operates under certain operating conditions;
- FIGS. 5*e*–5*h* show an alternative embodiment of the same door system of FIGS. 5*a*–5*d* in various operating positions;

FIG. 6 depicts examples of a carousel revolving door according to this invention with separately driven door panels, wherein:

- FIGS. 6*a*–6*d* show examples of progressive sequences of different operating conditions of this FIG. 6 carousel revolving door;
- FIGS. 6*e*–6*f* depict another variant of the FIG. 6 embodiment of this invention, which makes it possible to achieve the advantages of the invention to an increased extent;

FIG. 7 shows yet another embodiment of the invention with a carousel revolving door having two panels, each preferably with double panel sliding doors, wherein:

- FIGS. 7*a*–7*f* show progressive sequences of the positions of the various panels of the FIG. 7 door system in certain types of operations;
- FIGS. 7*g*–7*h* depict another variant of the carousel revolving door according to FIG. 7;

DETAILED DESCRIPTION OF THE PREFERRED EMBODIMENTS

Figure 1:
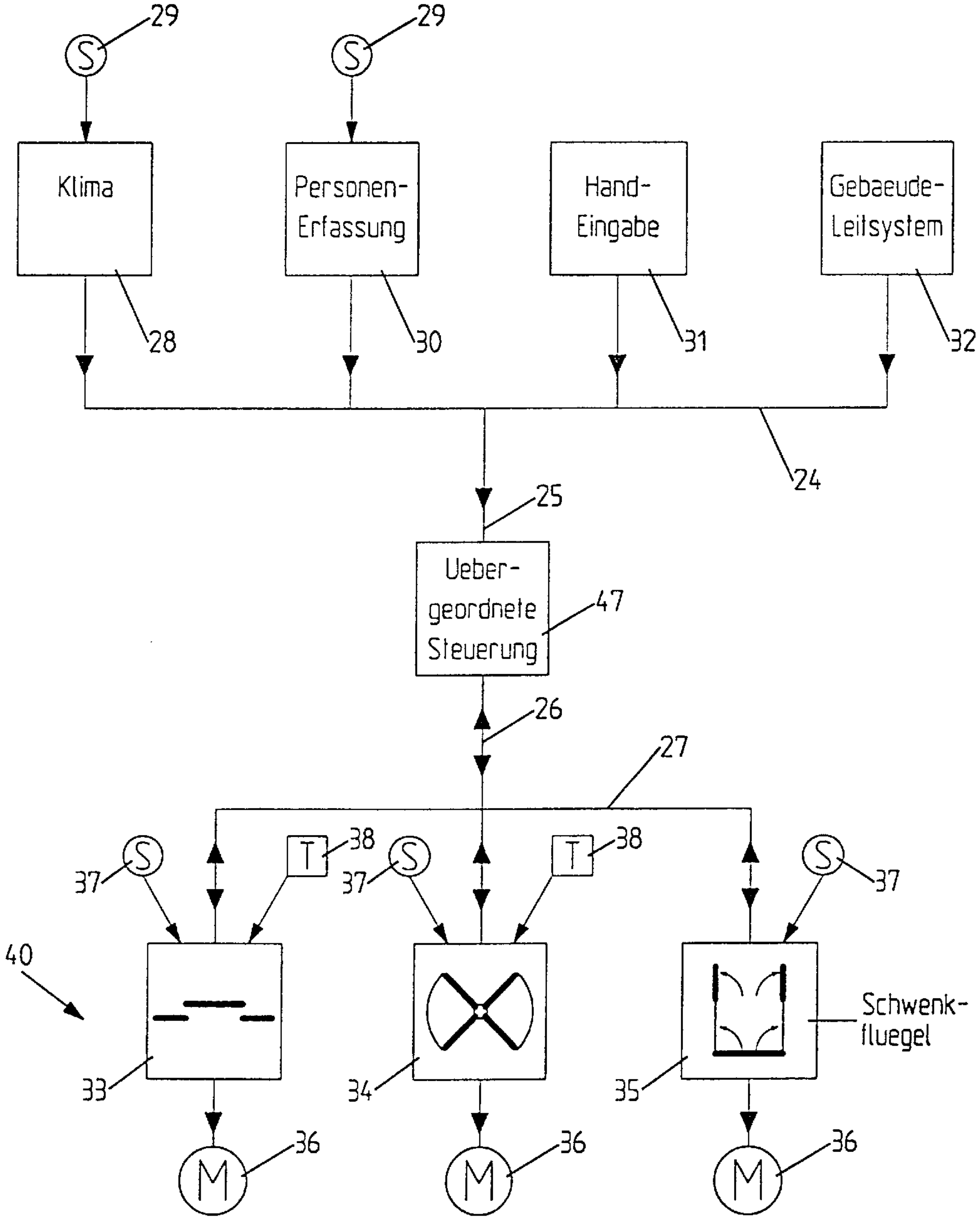
FIG. 1 is a schematic diagram of one embodiment of a control system for a door system constructed according to this invention.

With reference now to the drawing, and more particularly to FIG. 1 thereof, an embodiment of an operating or control system of the invention is shown for controlling the door system of the invention. As an example, it should be pointed out that a complete door system 40 consists of a number from 0 to n of at least partially separately motor-driven and controlled sliding door panels of a sliding door system 33, carousel revolving door panels of a revolving door system 34, or pivoting panels of a pivoting door system 35, or some combination thereof. These and other possible embodiments of door elements are each, or in combination, at least partially jointly motor-driven and controlled.

Separate sensors may be provided for each of the door elements of door systems 33–35, where each sensor detects the approach of one or more people to each door system and controls the various panels of each door system 33–35 accordingly. In addition, in the example shown, a conventional operator's panel 38 is provided for each door element of door systems 33–35 individually so that entries can be made manually with regard to the desired mode of operation, such as the extent of opening for the winter setting and other arbitrary parameters.

Drive 36 for each door element of door systems 33–35 is represented only by one motor, although in reality several different drive motors and other drive elements may be employed.

It is important that all door elements of systems 33–35 are controlled by higher-order controller 47 over common bus 27 and/or line 26, where the controller is in turn connected by line 25 to another bus 24. This bus may be identical to bus 27. Bus 24 is influenced by the parameters according to this invention, such as climate sensing system 28, where the climate conditions on both sides of the door system are detected with one or more sensors 29. In addition to the climate sensing system, bus 24 is also influenced by person sensing system 30 which is also equipped with one or more sensors 29.

According to the general description, it is thus possible to detect the number of people (approaching the building), their rate of approach, direction of approach and what type of people (approved visitors or not approved), as an example.

In addition, there is also a manual input 31 with which fixed values and preset values can be programmed into the system and the entire higher-order control system 47 may also be connected to building control system 32, which also supplies control signals to the higher-order control system.

The parameters 28–32 mentioned above thus act via bus 24 and line 25 on control system 47, which in turn controls the entire door systems 33–35, where each door element can be controlled by an additional individual controller (under the influence of sensors 37 and operator panels 38).

Figure 2:
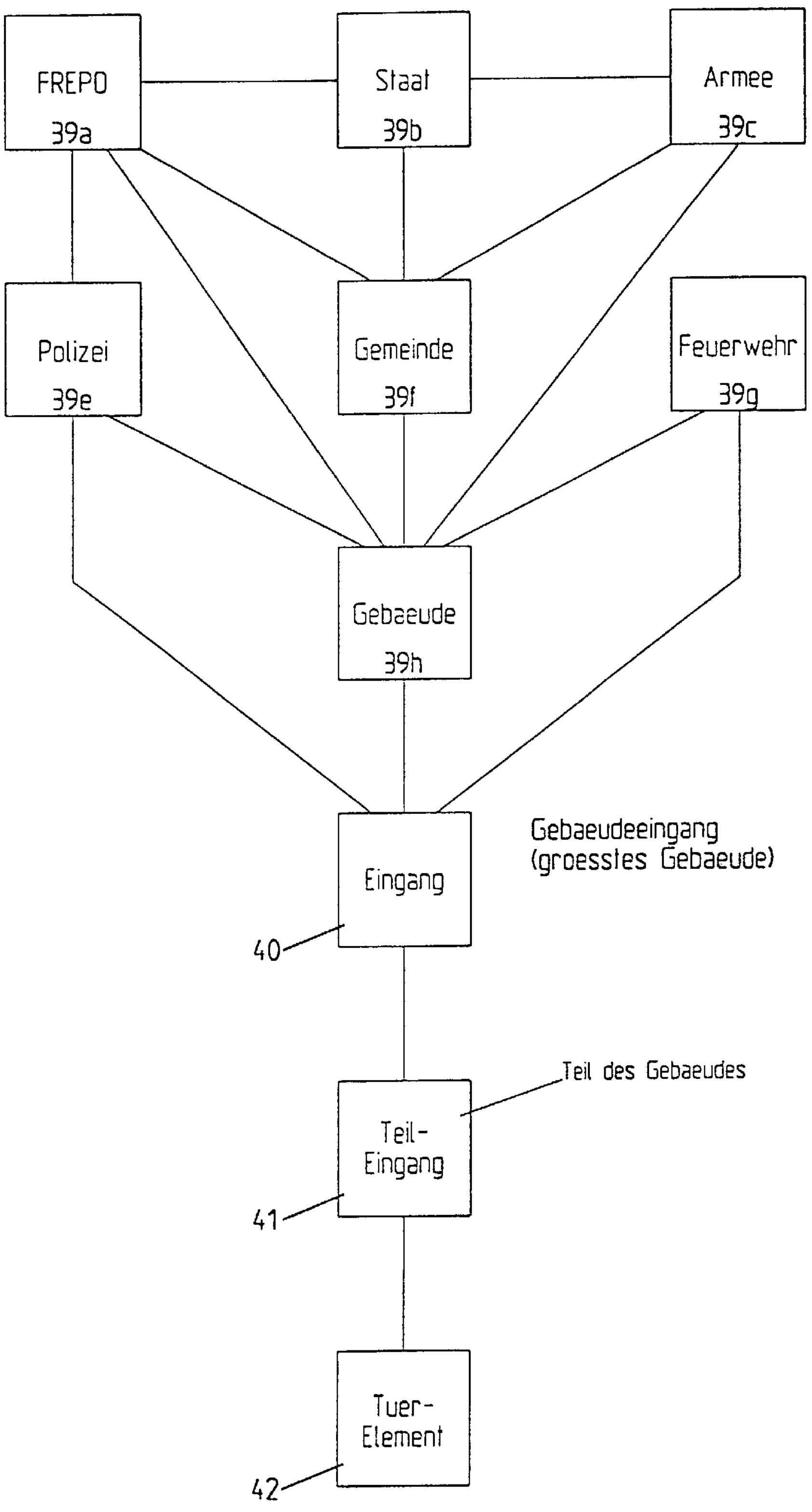
FIG. 2 is a schematic diagram of one embodiment of a connection of the control structure of FIG. 1 to a higher-order control structure.

FIG. 2 shows that in addition to the parameters acting on bus 24, a number of other parameters can also act as higher-order instances on door system 40, which in turn can act on one or more partial entrances 41. These partial entrances 41 may consist of door systems 33–35 illustrated above, for example, where each partial entrance consists of several door elements 42.

FIG. 2 also indicates that a number of higher-order instances can act on system 40, such as signals which may consist of control instance 39*a* (foreign police), control instance 39*b* (state) or control instance 39*c* (army). In addition, the various marked signal lines may also allow the building control system with the control instance 39*h* to be subject to the influence of the police with control instance 39*e*, the community with control instance 39*f* and the fire department with control instance 39*g*. All the control instances 39*a*–39*h* mentioned above then act on door system 40 in the manner mentioned above.

Figure 3:
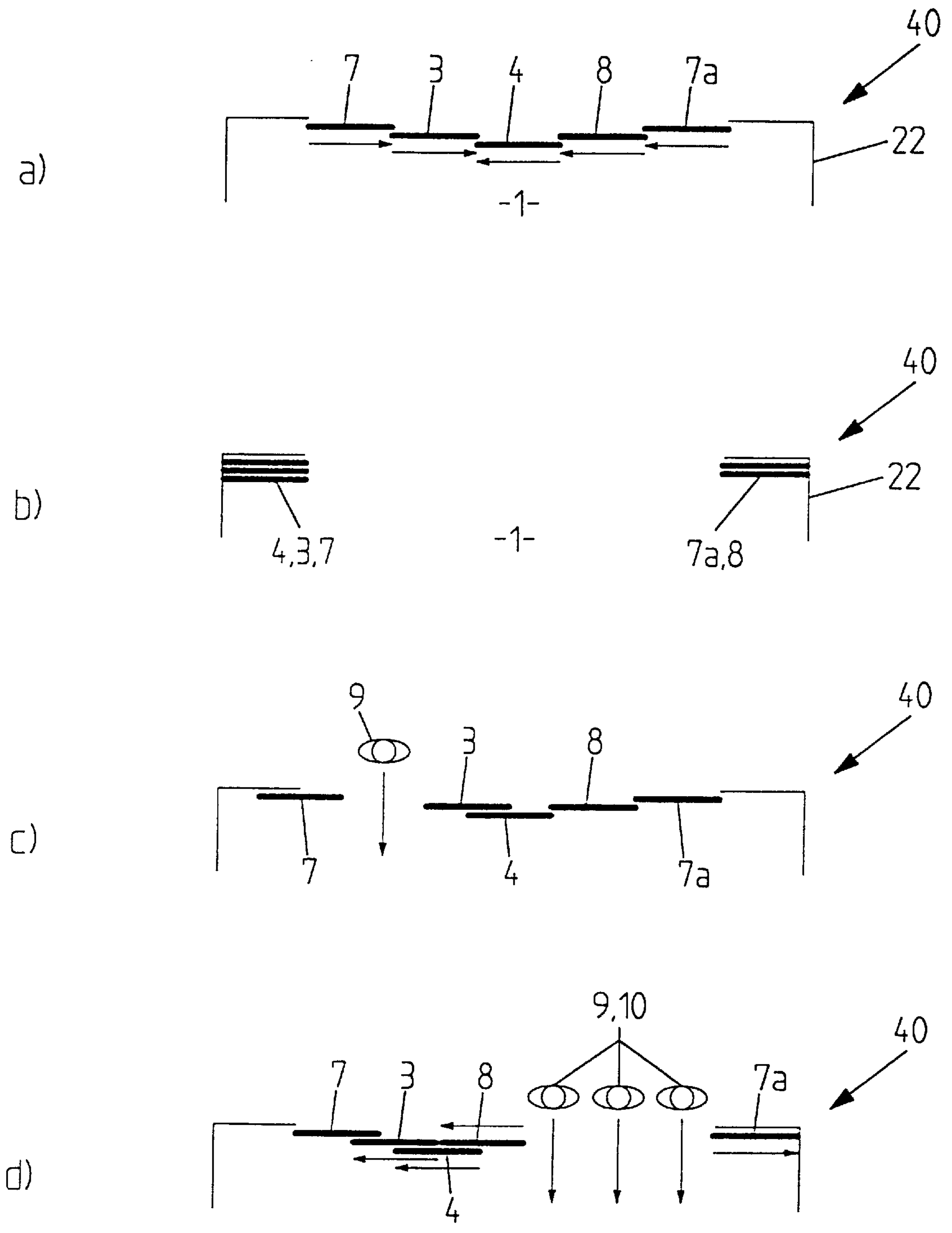

FIG. 3 shows as an example a door system 40 or a partial entrance 41 in its embodiment as sliding door system 33 of FIG. 1. A passageway or door opening 1 is defined by fixed part 22, which can be closed on the open side by telescoping sliding doors 3, 4, 7, 7*a* and 8. FIG. 3*a* shows the completely closed condition of door system 40, while FIG. 3*b* shows the completely opened position.

Figure 12:
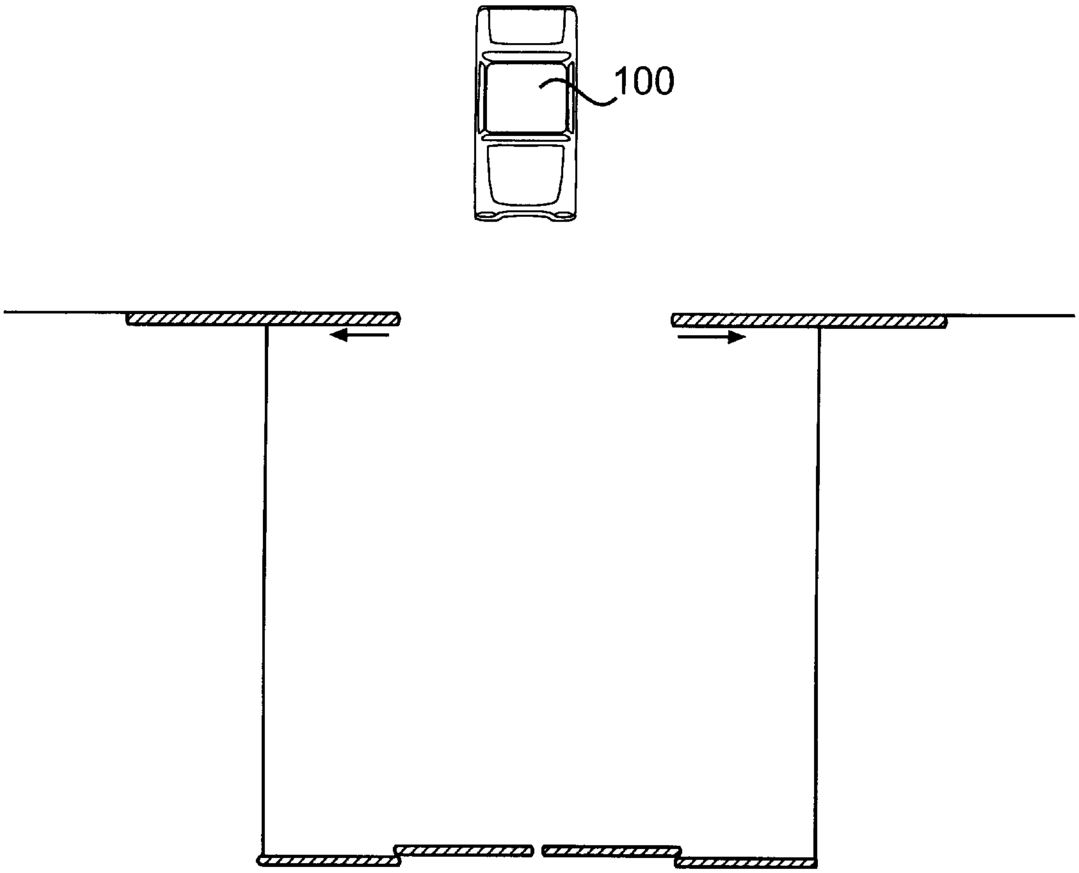
FIG. 12 depicts a vehicle approaching another embodiment of a door system according to the present invention.

FIGS. 3*c* and 3*d* show the operating status of door system 40 under the influence of the control system according to this invention. It can be seen here that a person 9 wants to enter passageway 1 on one side of the door system. According to this invention, the sliding door panels 3, 7 are merely pushed aside to form an individual passage for the person. The other sliding door panels 4, 7*a*, 8 remain in their initial closed position with no change. In a similar manner, the door panels can be pushed aside to allow the individual passage of a vehicle 100, as shown in FIG. 12.

FIG. 3*b* shows that several people 9, 10 want to pass through door system 40 as a group. This is detected by the control system according to this invention and only the sliding door panels 7*a*, 8 may be pushed to both sides in the direction of the arrows indicated, while all other sliding door panels remain unchanged. Or, as shown, panels 3 and 4 may be moved a short distance while major movement of panels 7*a* and 8 takes place. Here again, the open width of the door system is adapted to the number of people entering the building and especially to the location where people want to pass through door system 40 and to their relative grouping relationship. This exemplifies a major advantage of the present invention, namely, that door system 40 is opened only to the extent needed for the people passing through in each individual case.

Figure 3E:
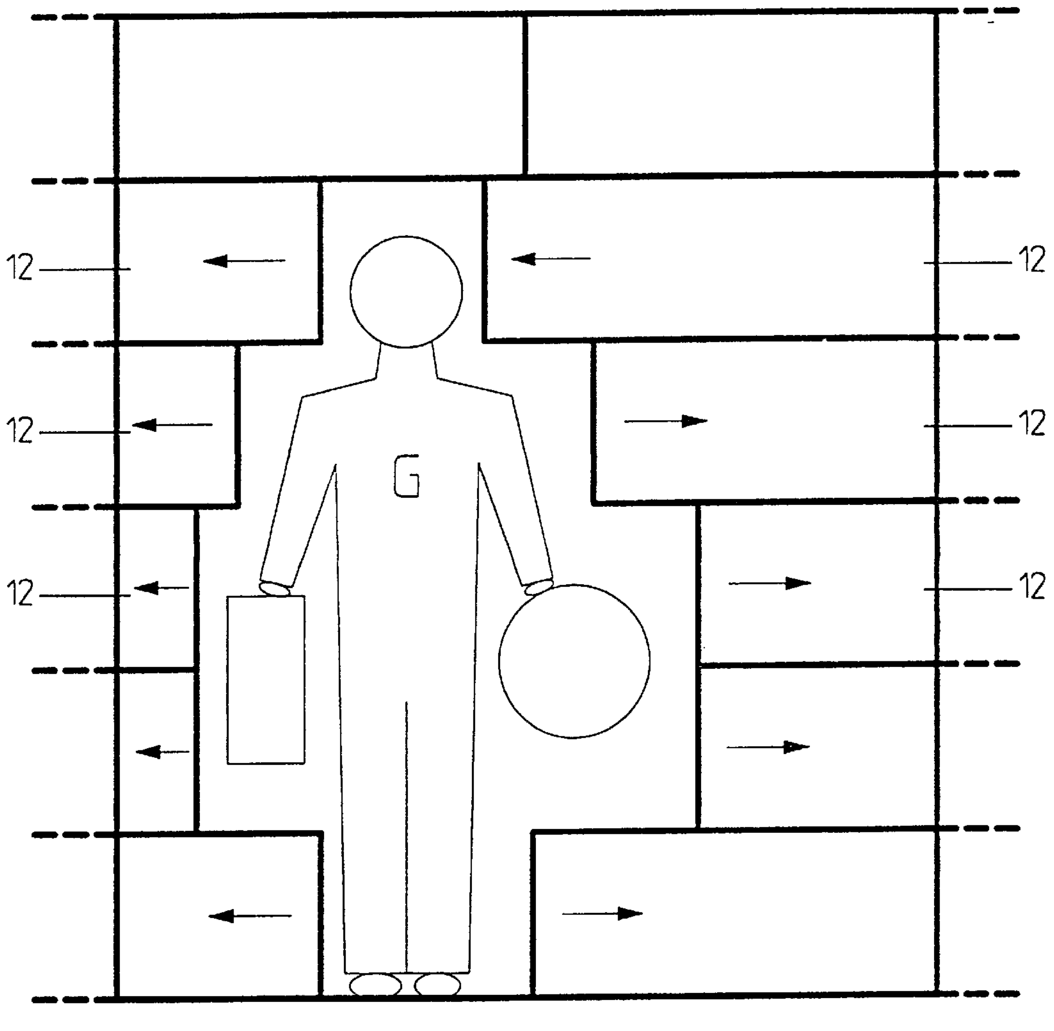
- FIG. 3*e* is an alternative embodiment of the door system according to this invention.

FIG. 3*e* shows another possible embodiment, where a number of separately motor-driven and controlled door elements 12 are arranged vertically one above the other to form the door closure. As shown, in the example, the door elements are opened, under control of the control system, only where and only to the minimum extent and duration necessary for the passage of the person (always when necessary due to the prevailing weather conditions, for example). Each door element 12 is driven so it can be displaced in the horizontal direction separately from the other similarly designed door elements 12. Therefore, the individual door elements 12 can be controlled individually or in groups.

This function is made possible according to this invention preferably by a combined processing of the signals from non-contacting sensors—either displaced together with the door panels and/or several stationary sensors placed at least approximately in the plane of movement of the door elements (e.g., a conventional light curtain), permitting video image processing of images of the environment around the door.

Figure 4:
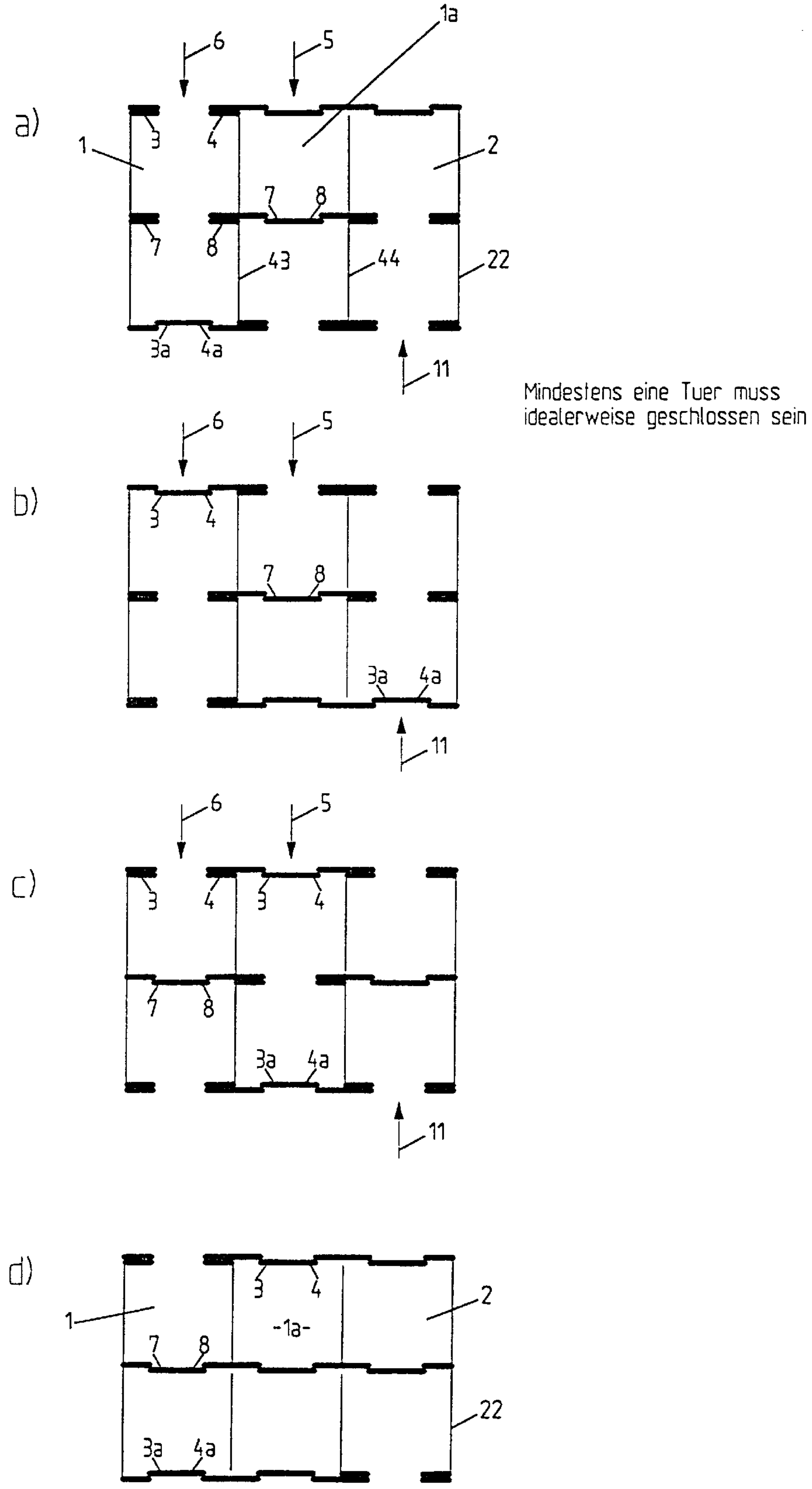

FIG. 4 shows another example of a door system according to this invention with a total of three passageways 1, 1*a*, 2 that are separated by appropriate partitions 43, 44. In the mode of operation illustrated here (automatically selected intelligently according to this invention as a function of the traffic flow) the two passageways 1, 1*a* serve as an entrance to the door system, so that people pass through the door system in the direction of the arrows 5, 6, while the passageway 2 serves as an exit for the people passing through the door system in the direction of arrow 11. Each passageway 1, 1*a*, 2 is provided with two pairs of sliding door panels 3, 4 and 3*a*, 4*a* and 7, 8. Since the passageways 1, 1*a*, 2 have the same sliding door panels, it is sufficient to describe only the function of a single passageway in greater detail.

The FIG. 4 door system thus consists of three groups, each consisting of three successive double sliding doors with, for example, a total of 18 separately driven sliding panels, where two groups (or in the extreme case all three groups) may be controlled as the entrance or exit, depending on the prevailing direction of traffic.

As shown by the chronological sequence of a normal movement process illustrated by FIGS. 4*a*–4*c*, for a high volume of traffic in both directions, at least one of the two accesses reserved for this purpose (passageway 1, 1*a*) is open continuously in the momentarily preferred direction of movement (depending on the traffic situation), whereas in the opposite direction where there is less traffic, the passage must be blocked (passageway 2) for at least one third of the time. When traffic flow is low and the weather is not very cold, a passage (1, 2) remains open and waiting for people to pass through in each direction according to FIG. 4*d*, while the third passage (passageway 1*a*) opens as a "substitute" as soon as one of the other doors closes after a person enters. In cold weather and when traffic flow is low, however, all three passageways are usually closed on both sides to minimize heat loss and are opened only as needed.

It is self-evident that the functional flexibility of the door system of this invention can be guaranteed even better if the embodiments of FIGS. 3 and 4 are combined by replacing door elements 3-4, 7-8, of FIG. 4 by an arrangement similar to that in FIG. 3.

Figure 5:
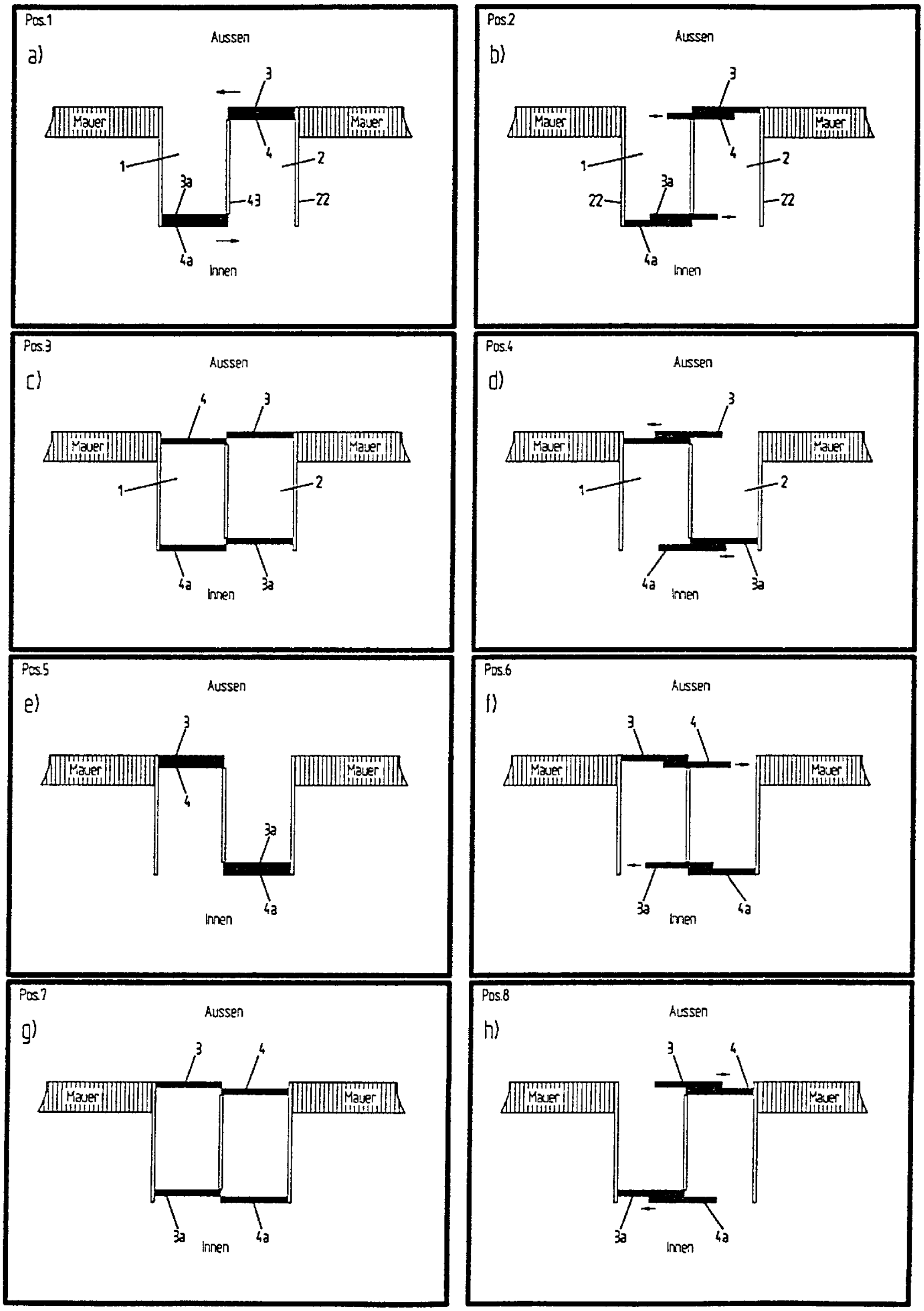

FIG. 5 shows as another, much simpler and thus less expensive embodiment a door system with four simple, separately driven single sliding panels 3, 4 and 3*a*, 4*a* that define between them two passageways 1, 2 that are separated by a middle partition 43.

FIGS. 5*a*–5*h* show a normal cycle such as that which takes place repeatedly and without interruption when there is considerable traffic. Just as a traditional, motor-driven carousel revolving door rotates without interruption in such a case, the given movement cycle is repeated again here. Door panels 3 and 4*a* on the one hand and 4 and 3*a* on the other hand move in opposite directions at the same time, as is evident, for example, for 3 and 4*a* from a comparison of FIG. 5*a* with the condition according to FIG. 5*b* just a few seconds later. The freedom from drafts is demonstrated as an example here, since the alternating pendulum movement of two independently motor-driven and controlled door elements each moving in opposite directions relative to each other assures that each of the two passageways 1 and 2 is always closed completely on at least one side. When traffic is light, the cycle does not run continuously but instead only as needed, when the sensor system detects at least one person wanting to pass through the door. In other words, if one person wants to enter passageway 1 from above with reference to FIG. 5, sliding door panel 3 moves aside, so that passageway 1 is opened. Then with the opposite sliding door panel 3*a* closed, the person passing through the door remains in passageway 1 until the sliding door panel 3 blocks the passageway 1 again from the entrance side and at the same time sliding door panel 3*a* releases the exit side of the passageway 1. This takes place in a similar manner with respect to the passageway 2 that has the function of an exit.

When traffic is even lighter and/or weather conditions are unfavorable, the cycle is no longer automatic, and instead the entrance is in a resting state in the completely closed position according to FIGS. 5*c* or 5*g* and door elements 3 and 4*a*, for example, open individually as needed only when and only to the extent and duration necessary for the passage of a person. Under these conditions, the control system preferably assures that drafts are prevented in a known way by mutual locking of the opening of the two closures of a passageway.

It is important that the control system of the door system according to this invention performs the change between the different modes of operation and conditions described above automatically to always assure an optimum performance of the entrance (e.g., freedom from drafts and minimum heat loss are balanced against a customer-friendly openness that is also desired) in accordance with the prevailing situation with regard to traffic flow and weather conditions.

The same function can be achieved with just two operated sliding door panels, but with greater space utilization. When using a circular sliding door, which corresponds in function to the position illustrated in FIG. 5*a*, this is possible without any sacrifice with regard to space requirements.

Figure 6:
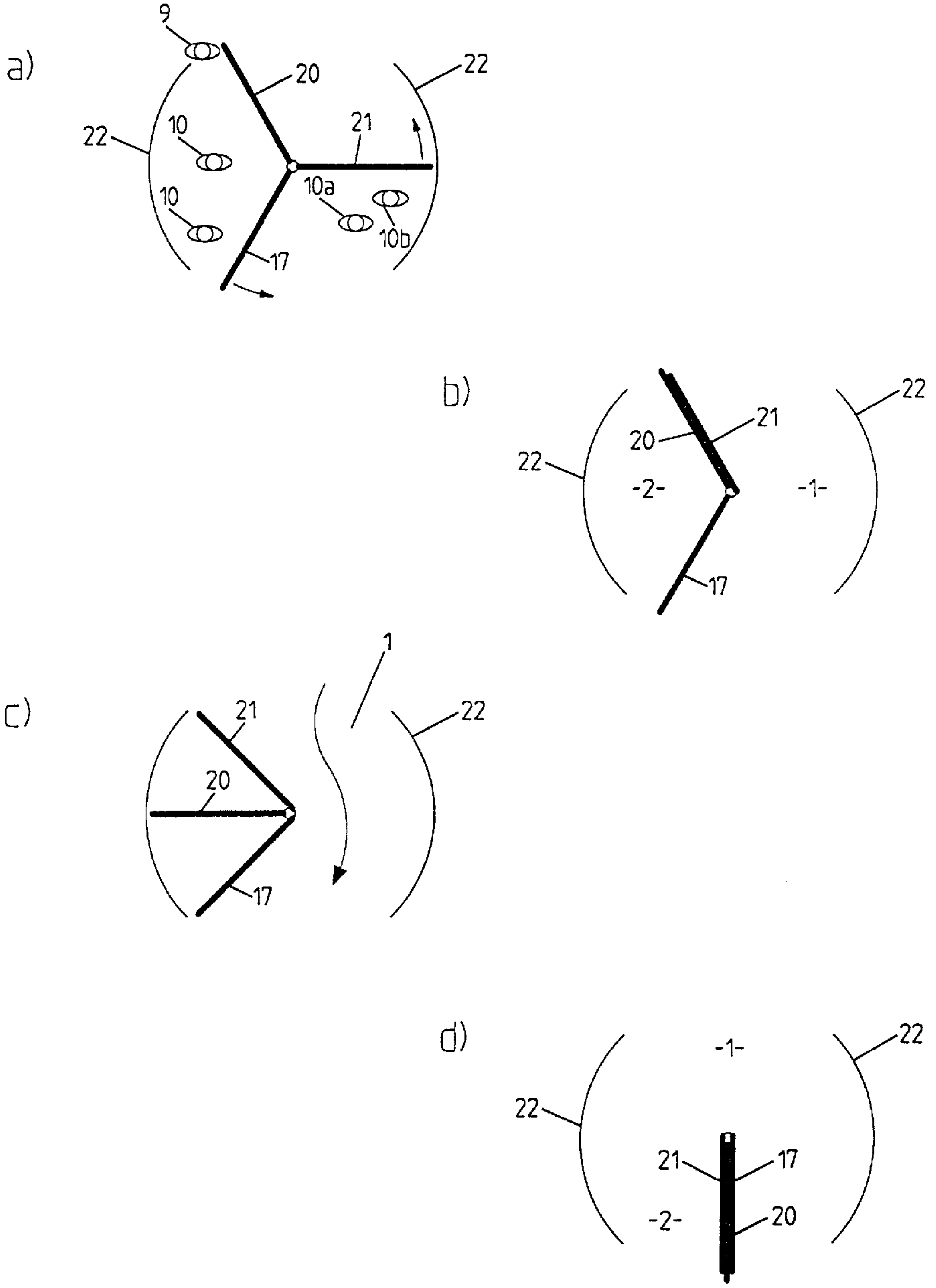
Figure 6:
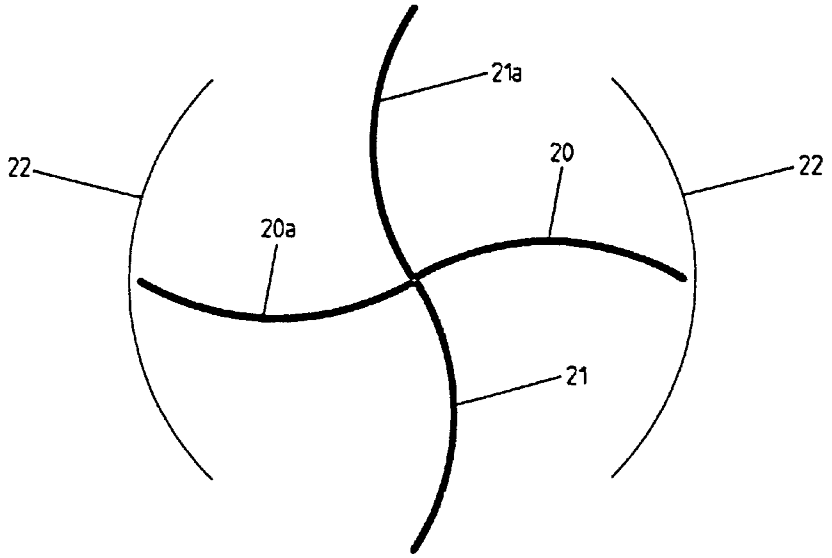
Figure 6:
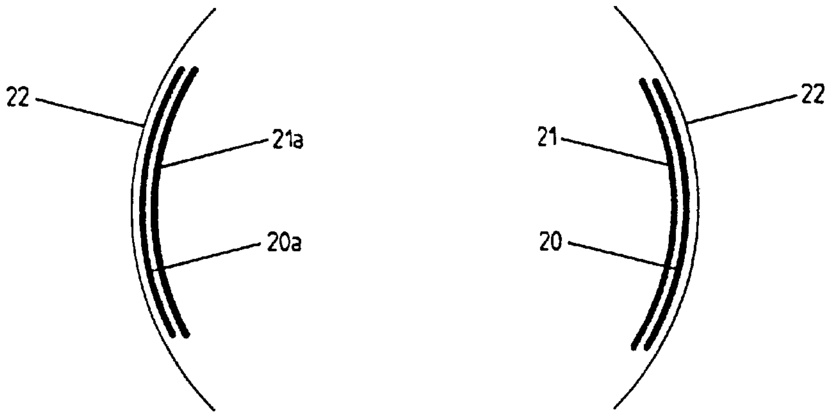

FIG. 6 shows as an example a carousel revolving door according to this invention with separately driven door panels. The great advantages in comparison with the conventional solution are clear, especially in the case of impaired movement of a door panel due to the response of a safety sensor system:

- the moving mass to be stopped by emergency braking is significantly smaller,
- this causes much less interference with the door function and thus with the other users.

In the example of FIG. 6*a*, revolving door panel 20 is stopped to prevent person 9 from being trapped, but for the time being revolving door panel 21 can continue to revolve normally so that people 10*a* and 10*b* are not affected by any interfering situation. If it is not absolutely essential to prevent drafts, revolving door panels 17 and 21 may automatically continue turning until they reach the position illustrated in FIG. 6*b*, so that people 10 can continue to pass through the door unhindered and additional people can use this passage unhindered until the obstacle is eliminated, whereupon the doors automatically return to normal operation with synchronized rotation of all panels 17, 20, 21.

In special situations (emergency exit) the doors may be motor driven into position FIG. 6*c* or perhaps FIG. 6*d*, for example, to permit free passage.

FIG. 6 thus shows a carousel revolving door with revolving door panels 17, 20, 21 driven independently of each other in a pivoting motion by the control system according to this invention. Revolving door panels 17, 20, 21 can even be pivoted into parallel positions in relation to each other according to FIG. 6*d* to achieve optimum opening of the passage.

FIGS. 6*e*–6*f* show an even more convenient variant. Revolving door panels 20, 20*a*, 21, 21*a*, which are curved with at least approximately the same radius as the surrounding walls of the entrance, can be rotated or displaced manually (or preferably by motor drive) into the vicinity of surrounding walls 22, so a completely free passage can be achieved in case of need by analogy with FIG. 6*d*. It should also be pointed out that the curved revolving door panels also permit a more aesthetically attractive and functional solution than the traditional flat door elements.

Figure 7:
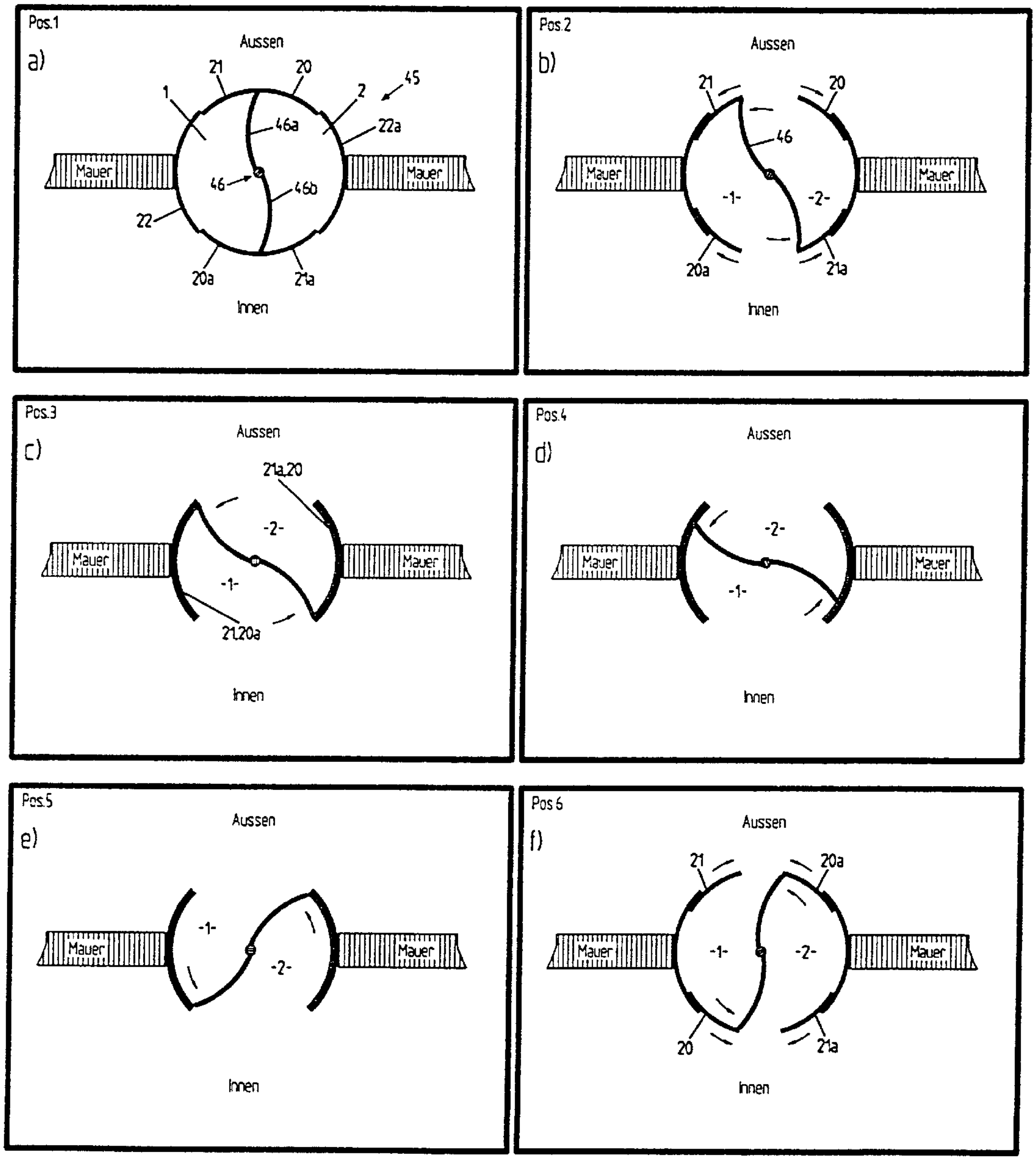
Figure 7:
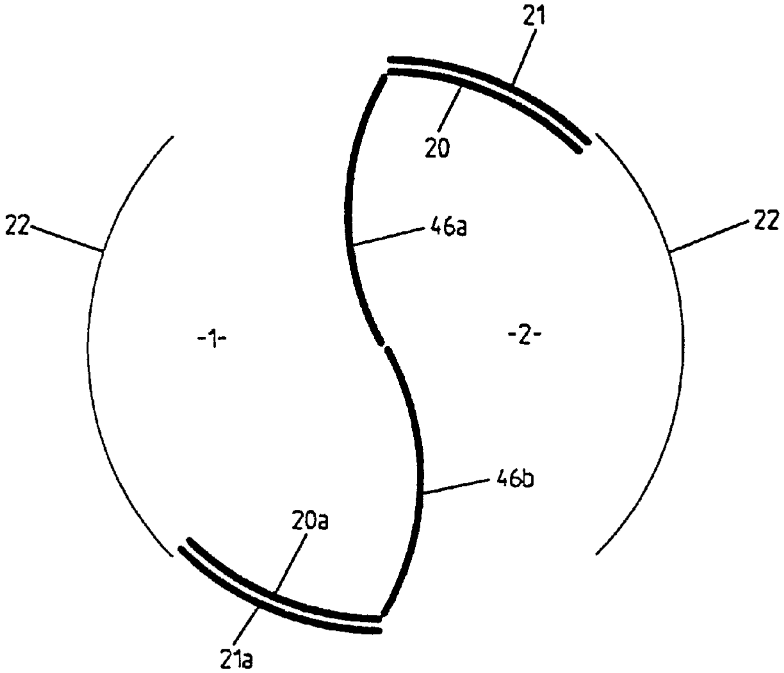
Figure 7:
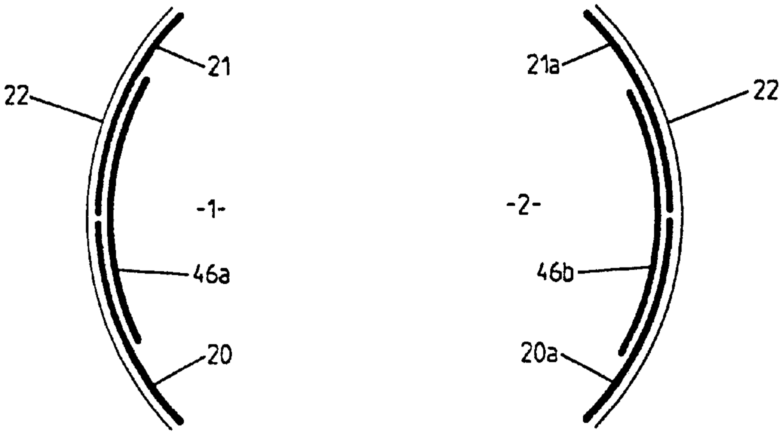

FIG. 7 shows as another embodiment a two-panel carousel revolving door system 45 with two preferably double panel sliding doors, preferably each with double panels, preferably designed as circular sliding doors. As indicated by the normal chronological sequence a>b>c>d, this permits a vastly superior functionality that is optimal in all regards and clearly superior to the similar conventional solution 1.i, specifically:

- a longer open time,
- opening from the center possible,
- greatly reduced mass for emergency stop,
- user-friendly performance with the response of safety sensors,
- greater flexibility (numerous operating modes are possible),
- optimum adaptation to traffic and weather permitted,
- innovative overall impression.

This is true in particular if the two revolving door panels according to 7*e* are designed so they can be pivoted outward, either manually or preferably motor-driven, so here again a free passage can be created if desired. The revolving carousel door consists essentially of the stationary walls 17, 17*a*, two internal revolving door panels 46*a*, 46*b* as well as two outer circular sliding door elements 21, 21*a* or 20, 20*a* which are provided in pairs.

FIGS. 7*a*>7*b*>7*c*>7*d*>7*e*>7*f* illustrate a normal chronological sequence that is characterized by the control of coordinated movements of the individual motor-driven and controlled door panels 46*a*, 46*b*, 20*a*, 20*b*, 21*a*, 21*b*, which are characterized by at least approximately continuous revolving movement of the revolving door panels 46*a*, 46*b* when there is high traffic flow and undisturbed operation. The advantages described above with regard to functionality and are readily apparent from this illustration, especially taking into account the analogies with other embodiments described above.

The peripheral length of the inside revolving door panels 20, 20*a* corresponds approximately to the total peripheral length of the outer revolving door panels 21 and 21*a*.

A central revolving door panel 46 is also provided with this revolving door system 45 and it in turn consists of individual revolving door panel parts 46*a*, 46*b* according to this invention.

To begin with, it can be seen from FIG. 7*g* that the requirement for draft-free passage, for example, when traffic is light, can be met in a manner similar to that described for FIGS. 5*a*–5*b* with the help of the sliding door panels 20*a*, 21*a* that border passageway 1 if the central revolving panel 46, which may be curved in an approximate S-shape, for example, remains fixed in the position illustrated here and thus, as an independently movable partition that, however is fixed in this mode of operation, separates the two passageways 1, 2 from each other.

In an improvement on the embodiment according to FIGS. 7*a* and 7*b*, central revolving door panel 46, which is approximately S-shaped, with its two revolving door panel parts 46*a*, 46*b* as illustrated in FIG. 7*h*, may also be pivoted, displaced or moved to the side either manually or preferably by a processor controlled motor in order to move these two revolving door panel parts 46*a*, 46*b* completely out of the passage area, to thus yield on the whole a central passageway consisting of the two passageways 1, 2.

It can easily be seen that in this position of the revolving door panel parts 46*a*, 46*b*, for example, under relatively favorable weather conditions (corresponding to the right side of the diagram in FIG. 8), a normal draft-proofing control with or without mutual locking of the openings may also be implemented easily.

It is also clear that according to this invention, another improvement on the functionality of the embodiment shown as an example in FIG. 7 can be achieved by combination with other features according to this invention, as described above, in particular those according to FIGS. 3 and 4.

Using the characteristics defined above as examples, the functioning of one example of an entrance, according to this invention, can be represented graphically in highly simplified form, according to FIGS. 8*a* and 8*b*, as a function (steady-state or incremental, degressive, progressive or any otherwise definable function to meet the given requirements) of the closure (based on load) as well as the freedom from drafts (if allowed by the environment), and the perviousness (depending on weather conditions, outside temperature, etc.).

FIG. 8*a* illustrates the relationship between the closure of the door system (relative to load) plotted on the ordinate in comparison with the perviousness of the door system (relative to the environment) plotted on the abscissa. Two different curves are shown here, such as those that would be obtained in two practical cases. Both cases show a descending curve starting from a value of 1 (or 100%), as is also the case illustrated in FIG. 8*b*, which illustrates the freedom from drafts (on the ordinate) as a function of the perviousness (relative to the environment) plotted on the abscissa. The term "perviousness relative to the environment" refers to the perviousness of the door system, which depends on other parameters such as the weather conditions, the interior conditions in the building (the number of air changes, etc.) and other parameters.

Figure 8:
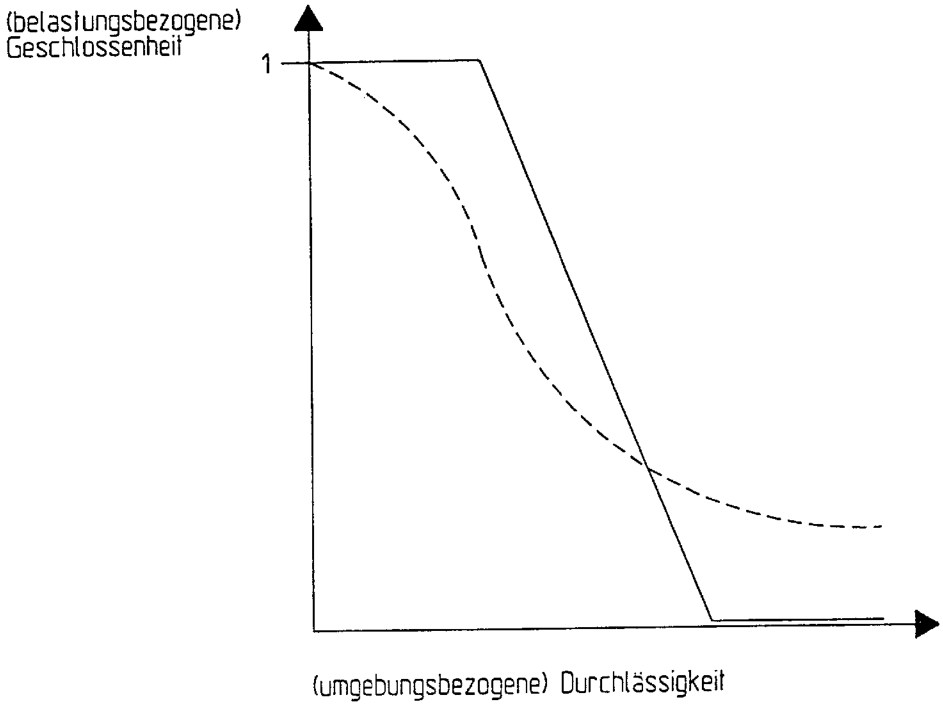
FIGS. 8*a* and 8*b* show graphic plots of examples of the relationships made possible by this invention between prevailing ambient conditions and important entrance characteristics.
Figure 8:
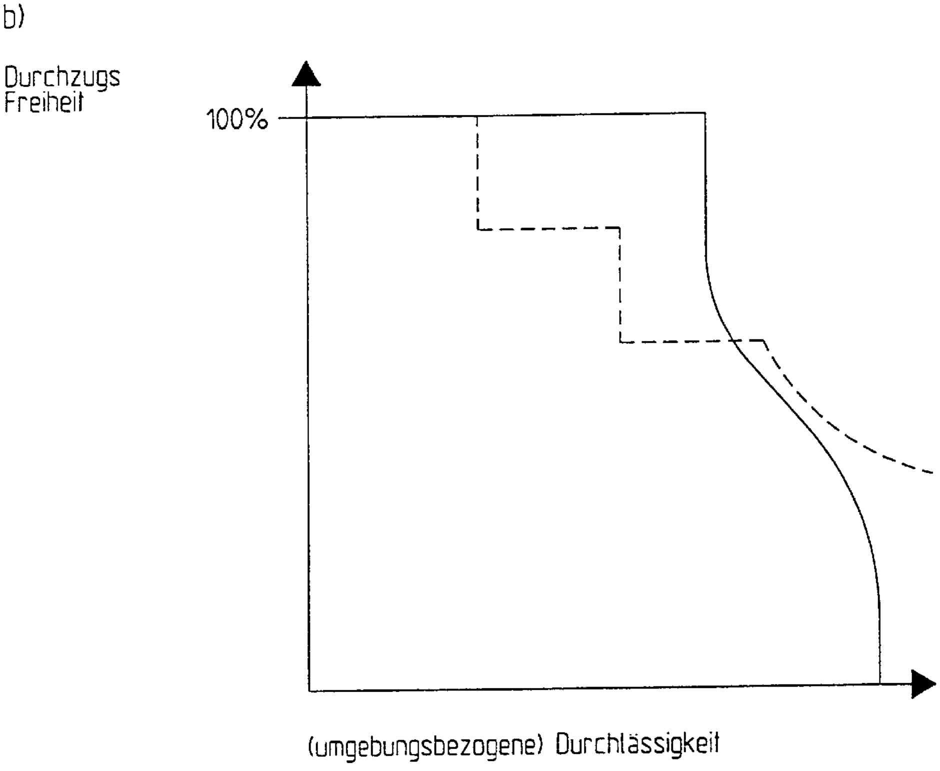
Figure 9:
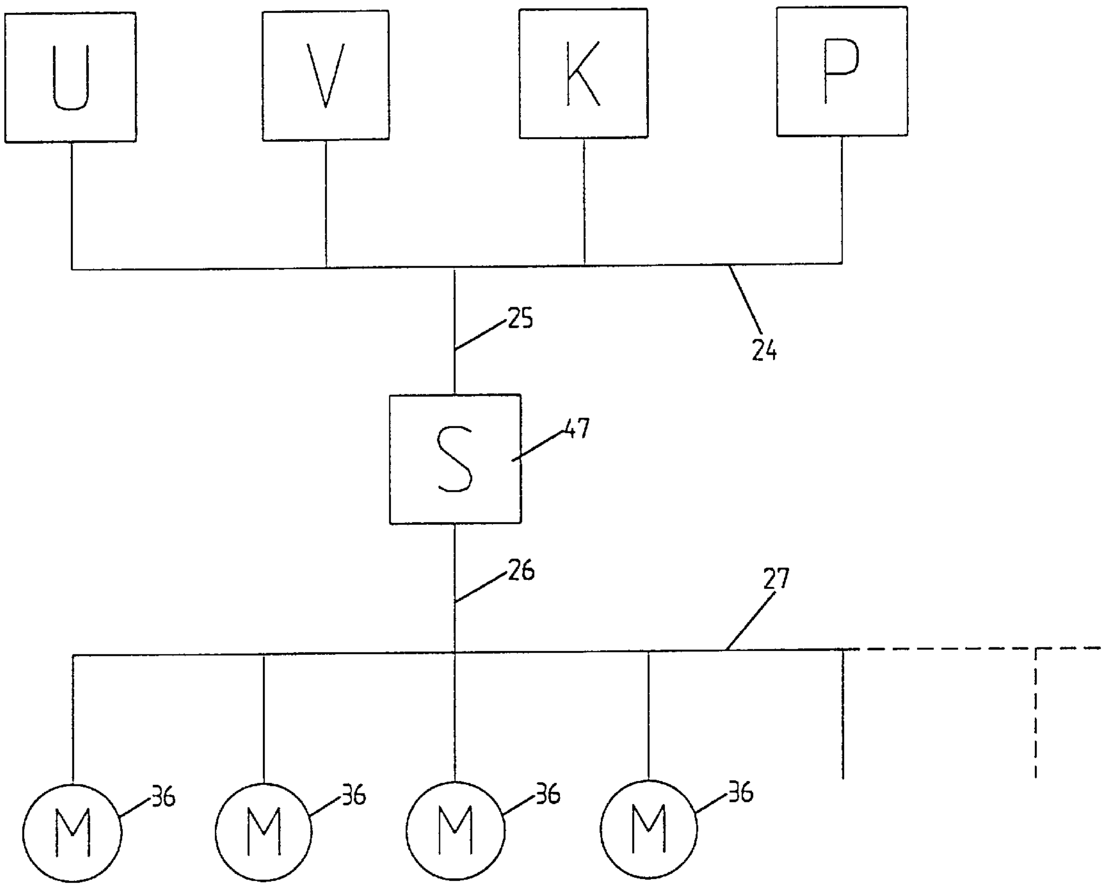
FIG. 9 is a simplified block diagram of an installation according to this invention.
Figure 10:
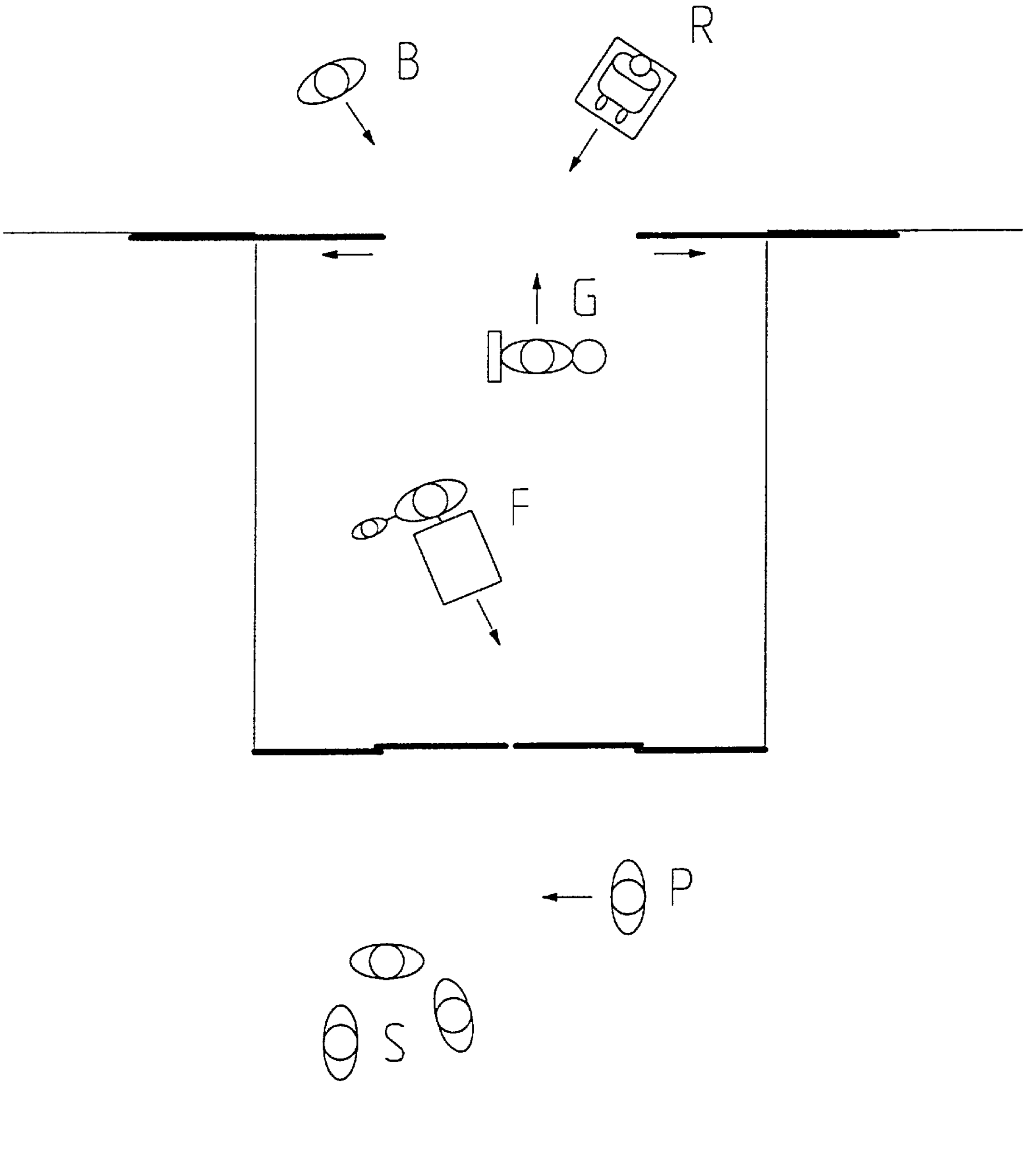
FIG. 10 shows an example of a door system of this invention together with its environment.
Figure 11:
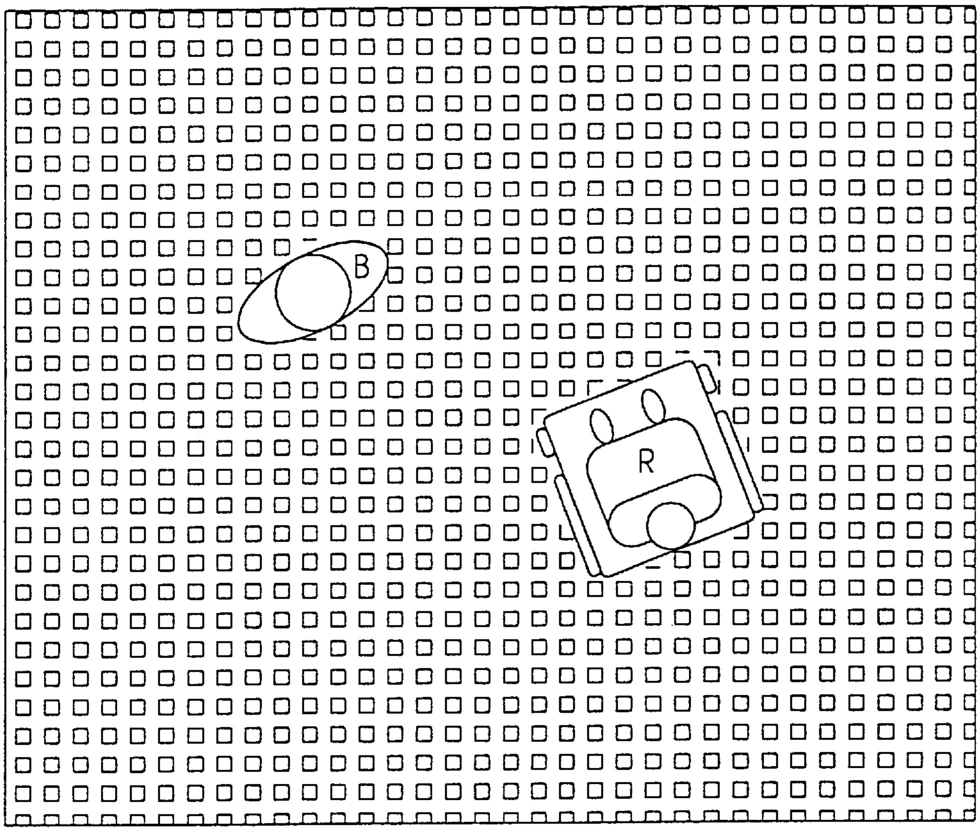
FIG. 11 is an enlarged detail of a portion of FIG. 10 showing a different relationship of some of the elements therein.

FIG. 9 shows a block diagram of a system according to this invention, simplified to the most essential elements, namely:

S—corresponds to the central control system 47, which is discussed in detail in the description of FIGS. 1, 2 and 8, and communicates with the other elements over lines, interfaces and/or buses and optimizes the actions of the criteria entered according to M and/or self-developed (self-learning) criteria by utilizing the signals from U, V, K, P and M. The same nomenclature as that explained in conjunction with FIG. 1 also applies to the same parts here. It is self-evident that the intelligence of the control system can also be distributed, for example, to other elements shown here. In particular, these elements include the following:

U—a sensor system consisting of known elements to supply control system S with the required information regarding ambient conditions (weather, temperature, wind, pressure differences, air turnover requirements, etc.);

V—a sensor system, which is discussed in particular in the description of FIGS. 10 and 11 in more detail and supplies control system S with the required information about the traffic situation in the vicinity of the doors (e.g., type, location, size, direction of movement, speed of movement, identification, etc., of the objects such as persons and/or vehicles using the passage);

K—a sensor system consisting of known elements to supplement V and supply control system S with the required information (especially from the vicinity around moving door elements) to prevent collisions (safety!) of moving door elements with objects using the passage. It is self-evident that it is difficult to differentiate K and V, and especially in simpler systems according to this invention, K may also assume the functions of V;

P—a device for entering parameters that are taken into account by control system S in performing its optimizations and consists of known elements (control switches, keyboards, power systems, etc.);

M—a number of independently controlled motors 36, magnets, monitors, signals etc. (discussed in particular in the description of FIGS. 3, 4, 5, 6, 7) that lock and/or move the elements of the system according to this invention, in particular the door panels, in a manner controlled by control system S;

and/or they relay signals to the objects using them in an attempt to achieve the most cooperative possible performance and they assure the optimum functioning of the system according to this invention.

FIG. 10 shows a diagram of an example of a door system together with its environment, where it consists of the three areas to be monitored by sensor system V (FIG. 9) on both sides of the door system and inside the door system as well as the objects B, R, F, G, P and S that are standing and/or moving in the vicinity of the door system or are using its passage, where the direction and length of the arrows represent the direction of movement and the speed of the objects, and B—is a user approaching the doors;

R—is a wheelchair user advancing slowly toward the system;

G—is a person loaded with lots of luggage (requiring more space) and approaching in the opposite direction from B and R;

F—is a woman with a child and a pushcart for purchases;

P—is a passerby diagonally approaching the doors;

S—is a stationary group of people engaged in conversation, where sensor system V (FIGS. 1, 9) conveys information for processing to control system S (FIGS. 1, 9), for example, video image processing, ideally information about the location, space requirements, direction of movement, speed of movement and optionally the identification of all objects, so the control system can optimize the movement of the door elements according to this invention such that on the one hand the passage of B, R, G and F (through the door) is hindered as little as possible, while on the other hand this is coordinated with the requirement that the system be free of drafts, etc., taking into account the weather conditions, etc., in the best possible way. As shown in FIG. 12, the door elements can also be optimized in a similar manner to allow the passage of one or more vehicles 100.

FIG. 11 shows as a detail of FIG. 10 how a cooperative background, such as a visually structured or specially colored floor covering, can greatly facilitate video processing, because the objects of interest are detected separately, depending on their sojourn on a structured floor covering element.

In view of the above description it is likely that those skilled in the art will envision modifications and improvements to this invention. The invention is limited only by the spirit and scope of the accompanying claims, with due consideration being given to a reasonable range of equivalents.

What is claimed is:

1. A method of operating a door system for the selective passage of people and vehicles, the door system comprising a passageway defined by a stationary structure, at least one independently movable door element, motive means for moving the door elements, processor means and controller means for controlling the motion of the door elements through the motive means, said method comprising the steps of:

establishing and storing in the processor means preselected criteria for optimizing the operation of the door element based on operator selectable parameters;

detecting factors related to the traffic approaching the entrance to the passageway;

detecting relevant ambient conditions other than light;

processing the traffic factors and the ambient conditions with respect to the preselected criteria in the processor means; and operating the door element in the door system responsive to the preselected criteria as adjusted in accordance with the traffic factors and the ambient conditions.

2. The method according to claim 1, wherein the preselected criteria can be varied through input means.

3. The method according to claim 1 or 2, wherein the preselected criteria can be defined differently for different modes of operation that can be selected by the operator.

4. The method according to claim 1, and comprising the further step of self-learning by the processor means based on the acquired operating experience and adjusting the preselected criteria as a result.

5. The method according to claim 1 or 4, wherein the processor means includes a higher-ranking processor, the method comprising the further step of processing sensor data at the entrance to the passageway on the current prevailing situation with regard to the traffic and the environment in order to implement optimum operation for the prevailing situation selectively with regard to energy loss, user friendliness, security and other relevant criteria.

6. The method according to claim 1 or 4, and comprising the step of obtaining and processing video images to obtain data on the traffic situation in the area of the door passage, with the traffic situation data sent to the processor means.

7. The method according to claim 5, and comprising the step of obtaining and processing video images to obtain data on the traffic situation in the area of the door passage, with the traffic situation data sent to the processor means.

8. The method according to claim 1 or 4, wherein at least some traffic factors are obtained by means of a video camera positioned above the door system and aimed in the direction of the ground, and analyzing the relevant scene to obtain data sent to the processor means.

9. The method according to claim 6, wherein the image processing is selectively supported by a cooperative design of the background, the lighting, the light shielding and the use of at least one group of at least two cameras observing the same scene from different angles with the results analyzed by the processor means.

10. The method of claim 8, wherein the image processing is selectively supported by a cooperative design of the background, the lighting, the light shielding and the use of at least one group of at least two cameras observing the same scene from different angles with the results analyzed by the processor means.

11. The method according to claim 6, wherein the image processing in the near range of the motor-driven door element is supported by sensors that are connected to the door element and move with it.

12. The method according to claim 8, wherein the image processing in the near range of the motor-driven door element is supported by sensors that are connected to the door element and move with it.

13. The method according to claim 1, wherein the movements of at least one of these elements or combinations of elements below the higher-ranking control system of the entrance or a section of the entrance are also controlled individually by a processor such that the location, width, speeds of movement and open time of the opening are selectively optimally adapted to the preselected criteria defined at that moment by the higher-ranking control system.

14. The method according to claim 1 or 13, and comprising the further step of tying the processors used to control the entrance into a higher-ranking network that relays not only necessary or useful instructions for optimum entrance functions but receives necessary or useful signals for their external support.

15. The method according to claim 5, and comprising the further step of tying the processors used to control the entrance into a higher-ranking network that relays not only necessary or useful instructions for optimum entrance functions but receives necessary or useful signals for their external support.

16. The method according to claim 1, wherein at least two of the participating processors communicate with each other via a bus.

17. The method according to claim 1 or 13, wherein the entrance includes at least one group of at least two successive door elements or combinations thereof, each of which in the closed position separates the two sides of the entrance hermetically or at least without drafts, together selectively with the stationary structure and other door elements.

18. The method according to claim 1 or 13, wherein the entrance is designed as a carousel revolving door with multiple panels, where the individual door panels are mounted so they can revolve independently about at least one axis that is at least approximately shared by at least two door panels, and the door panels are each equipped with a separately controlled drive.

19. The method according to claim 17, wherein the entrance is designed as a carousel revolving door with multiple panels, where the individual door panels are mounted so they can revolve independently about at least one axis that is at least approximately shared by at least two door panels, and the door panels are each equipped with a separately controlled drive.

20. The method according to claim 19, wherein the door panels are rounded with at least approximately the same radius as the outer enclosure of the carousel revolving door and are arranged with separately driven sliding door elements that cooperate with it which in the open position of the carousel doors prevent drafts with minimal interference with the free flow of traffic.

21. The method according to claim 18, wherein the door panels are rounded with at least approximately the same radius as the outer enclosure of the carousel revolving door and are arranged with separately driven sliding door elements that cooperate with it which in the open position of the carousel doors prevent drafts with minimal interference with the free flow of traffic.

22. The method according to claim 17, wherein at least one of the door panels is manually or motor-driven, preferably under the control of the higher-ranking control system, to shift at least one of the door panels to the vicinity of the side borders of the entrance area to create an unhindered passage for bulky goods, an emergency exit or rush-hour traffic.

23. The method according to claim 18, wherein at least one of the door panels is manually or motor-driven, preferably under the control of the higher-ranking control system, to shift at least one of the door panels to the vicinity of the side borders of the entrance area to create an unhindered passage for bulky goods, an emergency exit or rush-hour traffic.

24. The method according to claim 20, wherein at least one of the door panels is manually or motor-driven, preferably under the control of the higher-ranking control system, to shift at least one of the door panels to the vicinity of the side borders of the entrance area to create an unhindered passage for bulky goods, an emergency exit or rush-hour traffic.

25. The method according to claim 1, wherein at least one group includes at least two successive flat or curved sliding doors with at least two panels or panel doors or pivoting doors or similar doors in any combination, each with at least two separately driven and controlled panels as well as a partition that runs in the longitudinal direction of the entrance.

26. The method according to claim 25, wherein the partition can be displaced either as a whole or in elements, either manually or preferably by motor drive under the control of the higher-ranking control system, to move into the vicinity of the side borders of the entrance space to create an unhindered passage for bulky goods, an emergency exit or rush-hour traffic.

27. The method according to claim 25 or 26, wherein any sliding door panels provided can be folded out as a revolving panel selectively manually and motor driven, preferably under the control of the higher-ranking control system, to create an unobstructed exit for emergency situations, for bulky goods, or rush-hour traffic.

28. The method according to claim 1, wherein the control system is programmed so that the automatic adjustment in closure and freedom from drafts as desired by operators of the system are guaranteed under the most optimum possible conditions at all times in accordance with the prevailing situation with regard to the environment and traffic.

29. The method according to claim 17, wherein the control system is programmed so that the automatic adjustment in closure and freedom from drafts as desired by operators of the system are guaranteed under the most optimum possible conditions at all times in accordance with the prevailing situation with regard to the environment and traffic.

30. The method according to claim 20, wherein the control system is programmed so that the automatic adjustment in closure and freedom from drafts as desired by operators of the system are guaranteed under the most optimum possible conditions at all times in accordance with the prevailing situation with regard to the environment and traffic.

31. The method according to claim 1 or 20, wherein the higher-ranking control system of the entrance attempts to coordinate the people passing through the entrance by means of light signals, lighted messages, voice instructions, robot gestures, among others, that are adapted automatically to the prevailing situation.

32. The method according to claim 1 or 4, wherein important operative elements of the door system and the control system are designed to be redundant and self-monitoring to conform to the requirements for escape and rescue routes.

33. The door system according to claim 1, and further comprising:

an additional control system that responds to superceding commands that supercede a command sent by the sensors, wherein the superceding commands affect the operation of the door system.

34. A door system comprising:

at least one movable door element, configured for the selective passage of people and vehicles through a passageway;

at least one actuation device configured to move the door element;

at least one traffic detection device configured to detect traffic that is proximate to the passageway;

at least one ambient detection device, configured to detect at least one ambient condition other than light; and at least one processor device configured to receive data from the ambient and traffic detection devices, so that the processor can control the operation of the door element through the actuation device using the detected traffic and detected ambient conditions.

35. The door system according to claim 34, wherein the control of the door elements by the processor means is iterative.

36. The door system according to claim 34, wherein the door elements are separately driven and controlled.

37. The door system according to claim 34, wherein the door elements are arranged in a telescoping configuration.

38. The door system according to claim 34, wherein the door elements are arranged vertically.

39. The door system according to claim 34, wherein the traffic detection device detects at least one traffic factor selected from the group consisting of: speed, weight, density, direction, approved and not approved.

40. The door system according to claim 34, wherein the ambient detection device detects at least one ambient condition selected from the group consisting of: temperature, wind, precipitation and pressure.

41. A door system comprising:

at least one movable door element, configured for the selective passage of people and vehicles through a passageway;

at least one actuation device configured to move the door element;

at least one traffic detection device configured to detect traffic that is proximate to the passageway;

at least one ambient detection device, configured to detect at least one ambient condition other than light; and at least one processor device configured to receive data from the ambient and traffic detection devices, whereby the processor operates the door element by evaluating the ambient and traffic data with respect to door operation criteria stored in the processor.

42. The door system according to claim 41, wherein the door operation criteria are selected from the group consisting of: building air turnover requirements, differences between building pressure and atmospheric pressure, traffic load through the passageway, perviousness, and freedom from drafts.

43. The door system according to claim 41, further including superceding commands that supercede the door operation criteria, wherein the superceding commands are sent from the group consisting of: foreign police, state police, army, and fire department.

44. A door system for the selective passage of people and vehicles, the door system comprising:

at least one independently movable door element, wherein an opening and closing of the door element is controlled by sensors as a function of at least one climatic condition other than light and as a function of at least one comfort requirement in an interior area.

* * * * *

UNITED STATES PATENT AND TRADEMARK OFFICE

CERTIFICATE OF CORRECTION

PATENT NO. : 6,084,367
DATED : July 4, 2000
INVENTOR(S) : Heinrich Landert

It is certified that error appears in the above-identified patent and that said Letters Patent is hereby corrected as shown below:

Replace drawing sheets 1-14 with the attached 14 drawing sheets.

Signed and Sealed this

Nineteenth Day of June, 2001

*Attest:*

Nicholas P. Godici

*Attesting Officer*

NICHOLAS P. GODICI
*Acting Director of the United States Patent and Trademark Office*